United States Patent [19]

Levine

[11] Patent Number: 4,872,230

[45] Date of Patent: Oct. 10, 1989

[54] ELECTRICALLY POWERED AUTOMOBILE JACK AND NUT REMOVER

[76] Inventor: Anthony Levine, 5000 Brewster Dr., Tarzana, Calif. 91356

[21] Appl. No.: 185,892

[22] Filed: Apr. 25, 1988

[51] Int. Cl.$^4$ .................................................. B25F 3/00
[52] U.S. Cl. ........................................ 7/100; 254/126;
254/DIG. 2; 310/50
[58] Field of Search .......................... 7/100, 170, 138;
254/DIG. 2, DIG. 4, DIG. 3, 1, 122, 126, 93 H;
310/47, 50

[56] References Cited

U.S. PATENT DOCUMENTS

| | | | |
|---|---|---|---|
| 979,143 | 12/1910 | Faure | 310/50 |
| 3,977,278 | 8/1976 | Jackson | 81/57.11 |
| 4,653,727 | 3/1987 | Chang et al. | 254/126 |
| 4,706,937 | 11/1987 | Chung | 254/1 |
| 4,749,169 | 6/1988 | Pickles | 254/DIG. 4 |

Primary Examiner—Roscoe V. Parker
Attorney, Agent, or Firm—Browdy and Neimark

[57] ABSTRACT

A portable automatic automobile jack includes an electrically powered automobile tire nut remover. The jack is powered through a cigarette lighter type plug by the automobile battery, and has an outlet for receipt and powering of a tire nut remover or other equipment. In another embodiment, the nut remover, powered by the auto battery, drives the jack.

15 Claims, 6 Drawing Sheets

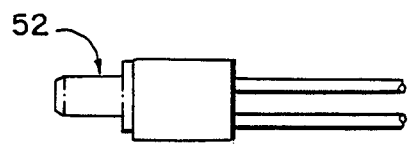
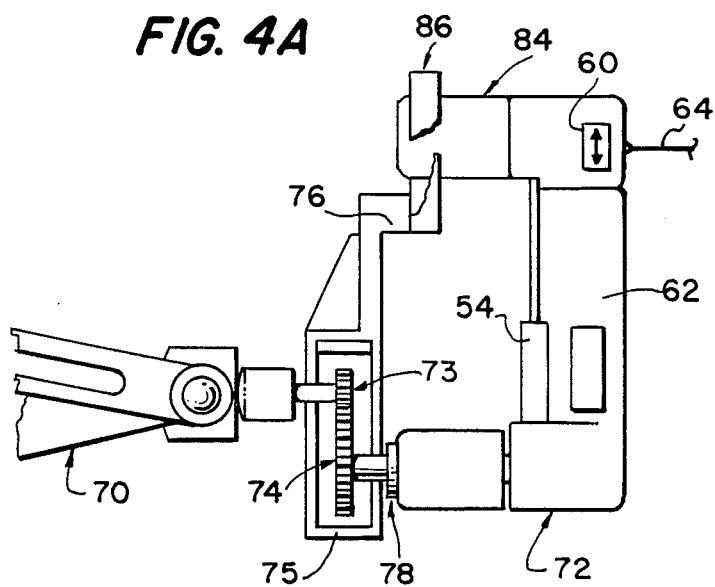
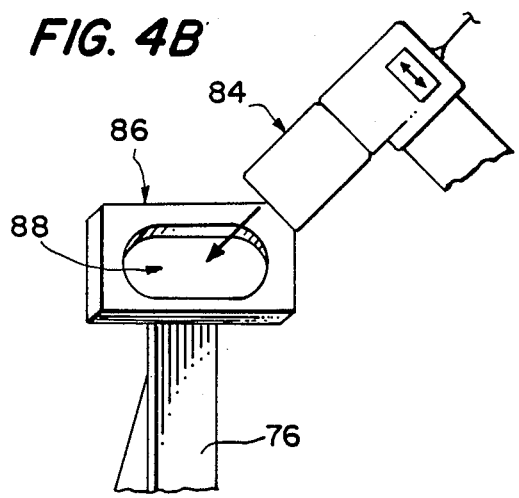

ELECTRICALLY POWERED AUTOMOBILE JACK AND NUT REMOVER

FIELD OF THE INVENTION

The present invention relates to improvements in the emergency changing of automobile tires, and more particularly it relates to a portable automobile jack which operates automatically in combination with an electrically operated tire nut remover.

BACKGROUND OF THE INVENTION

It is well known to have various types of lifting equipment to aid in the changing of a tire or to perform other types of jobs that require a raised car. The most common piece of equipment is the basic hand operated jack which is a standard accessory in most automobiles. These jacks require substantial effort on the part of the user, and especially present difficulties under adverse weather conditions, and for the elderly and handicapped under all weather conditions.

To solve this problem, jacks have been designed to operate on electricity, often from the automobile battery. However, even such electric jacks do not solve certain problems associated with changing tires. One of these problems is that a flat tire will often occur at night. The darkness makes it hard to see what one is doing. Another problem is that even though the jack is operated to lift the auto without much effort, it still takes considerable physical effort to remove the lug nuts from the wheel and to re-tighten same after the tire has been changed.

Another problem is that the car may be parked on an incline where it is too dangerous to operate a jack. It is often difficult for the operator, particularly when under the stress of having had a flat tire, to exercise good judgement on whether or not the slope is too great to safely jack up the car.

As most automobiles are provided with only one cigarette lighter, there is usually only one outlet for attachment of an electric motor. Thus, even if the auto owner has an electric jack and an electric outdoor light, only one of these can be plugged into the cigarette lighter outlet at one time.

A battery powered nut remover is also known, but this device is merely a conventional socket wrench driven by direct current. It cannot be used easily and is very difficult for most women, the elderly and the handicapped.

SUMMARY OF THE INVENTION

It is accordingly, an object of the invention to overcome deficiencies in the prior art, such as indicated above.

It is another object of the invention to facilitate tire changing in regard to ease, speed and safety.

It is yet another object of this invention to provide an improved auto tire changing system including an electrically powered car jack which operates through a cigarette lighter type plug and other accessories such as an electrically powered nut remover.

A further object of the invention is to provide an improved auto tire changing system including a light source so that the work area is illuminated at night.

Still another object of the invention is to provide a car jack and tire nut remover system which is lightweight enough to be easily carried by hand, and which is compact for storage within an auto trunk or the like.

Still a further object is to provide an electric car jack having a cigarette lighter type outlet into which an accessory such as an air compressor can be plugged so that the tires can be filled without manual pumping and without the need for a second power source.

Yet a further object of the invention is to provide an improved auto jack system powered through an auto cigarette lighter outlet by the auto battery, and having an automatic safety switch to prevent auto jacking when the auto is on a grade too steep for safe jacking.

These and other objects and the nature and advantages of the present invention will be more apparent from a detailed description of specific embodiments below, taken in conjunction with the drawing, wherein:

BRIEF DESCRIPTION OF THE DRAWINGS

FIG. 3A is a schematic representation of a 12 V accessory plug for an accessory such as the nut remover of FIG. 3 and for plugging into an outlet in the jack of FIG. 1;

FIG. 4A is a schematic representation of another embodiment of the present invention including a jack driven by an electrically powered nut remover;

FIG. 4B is a schematic representation of how the nut remover of FIG. 4A is held in place while it drives the jack;

FIG. 5B is slotted to minimize movement when used in the jack system of the present invention.

DETAILED DESCRIPTION OF THE PREFERRED EMBODIMENTS OF INVENTION

Figure 1:
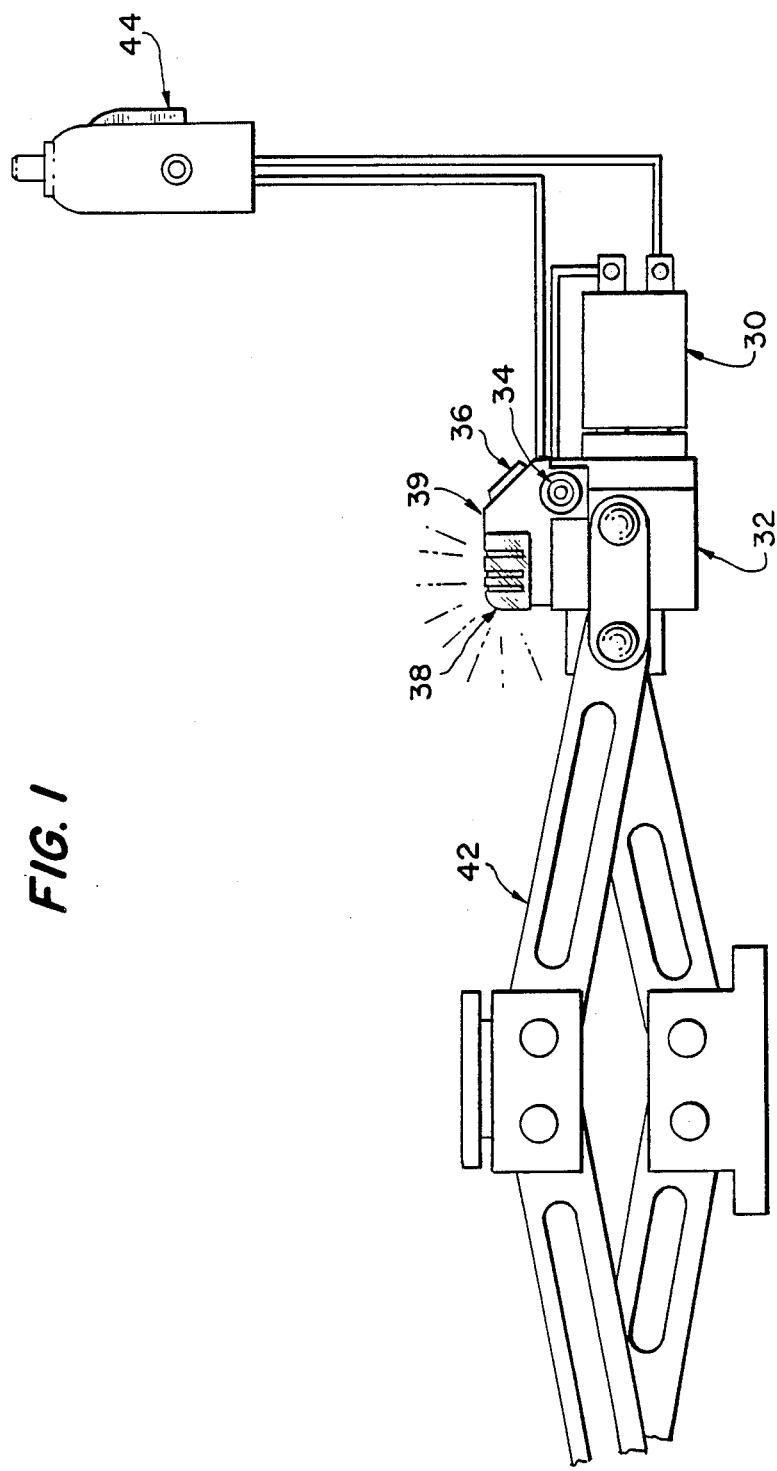
FIG. 1 is a cross-sectional schematic representation of a first embodiment of a self-contained electric jack system in accordance with the present invention.

Referring to FIG. 1, which shows one possible embodiment of the present invention, a typical scissors-type jack 42 is attached to a gear box 32 driven by a D.C. electric motor 30 which forces the jack to go up or down when a three-way switch 36 is set in the proper position. The gear box 32, driven by the motor 30, is powered by the automobile battery using a standard twelve volt lighter plug 44. The preferred embodiment also includes a housing 39 containing a light 38 capable of lighting up the immediate surroundings when the jack is being operated at night and also capable of lighting the underside of the car whether it be day or night.

Figure 1A:
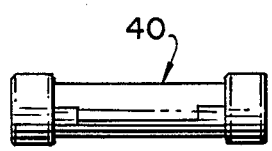
FIG. 1A is a schematic representation of a mercury kill switch level detecting device for use in accordance with an embodiment of the present invention.

The housing 39 also desirably contains a mercury kill switch 40, as shown in FIG. 1A, wired in series with the switch 36, to determine if the car to be jacked up is at dangerous angle, which could cause the car to fall off the jack, potentially injuring the user or the car. If the kill switch 40 determines the car to be at a precarious angle, it will not permit current to flow to the motor, thereby automatically preventing the lifting of the car. An extra twelve volt socket 34 is desirably provided in the housing 39 so that accessories can be plugged therein and operated, specifically a tire nut remover, a power tire pump, or an auxiliary light.

Figure 2:
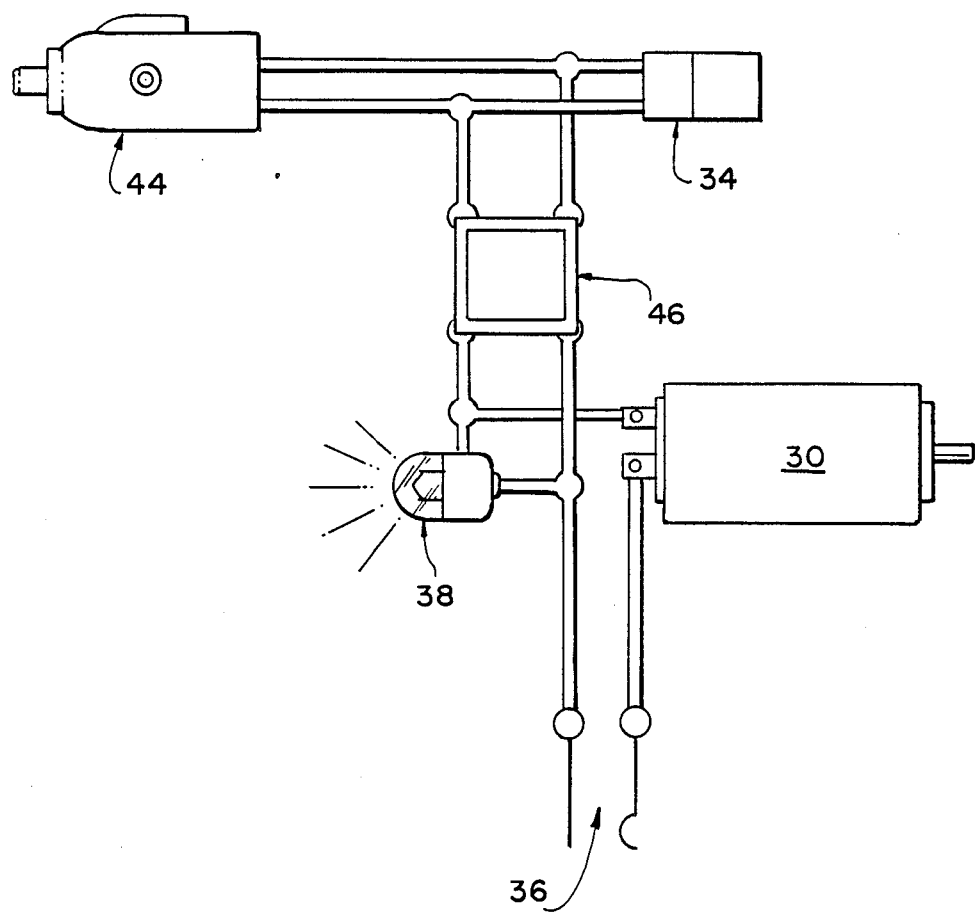
FIG. 2 is a schematic representation of a jack electrical circuit for the FIG. 1 embodiment of the present invention.

A suitable jack electrical circuit for the above described embodiment is shown in FIG. 2. The male cigarette lighter-type plug 44 fits into any standard automobile lighter outlet thus providing the circuit with power. The accessory plug socket 34 provides constant power to any of the accessories plugged-in regardless of whether the jack power on/off switch 36 is on or off so long as the plug 44 is in the lighter. Where the on/off switch 36 is a two-way switch, a polarity reversing switch 46 is used whereby one polarity allows the jack to raise the car up and the other polarity allows the jack to lower the car down. Where the switch 36 is a three-way switch, one position is for lifting, a second for off and a third for lowering. The light source 38 and the motor 30 are also shown in the circuit.

A nut remover 72 is shown in FIG. 4A in conjunction with a mechanical jack 70. The nut remover 72 is suitably U-shaped having a handle portion 62 at the base of the U, one leg containing a motor 58 which serves to drive a powered socket 80. The opposite leg is terminated with a non-rotating socket 84. A cord 64 brings D.C. from the auto battery as pointed out below, and a switch 60 and light 54 are also provided in the nut remover housing.

Figure 3:
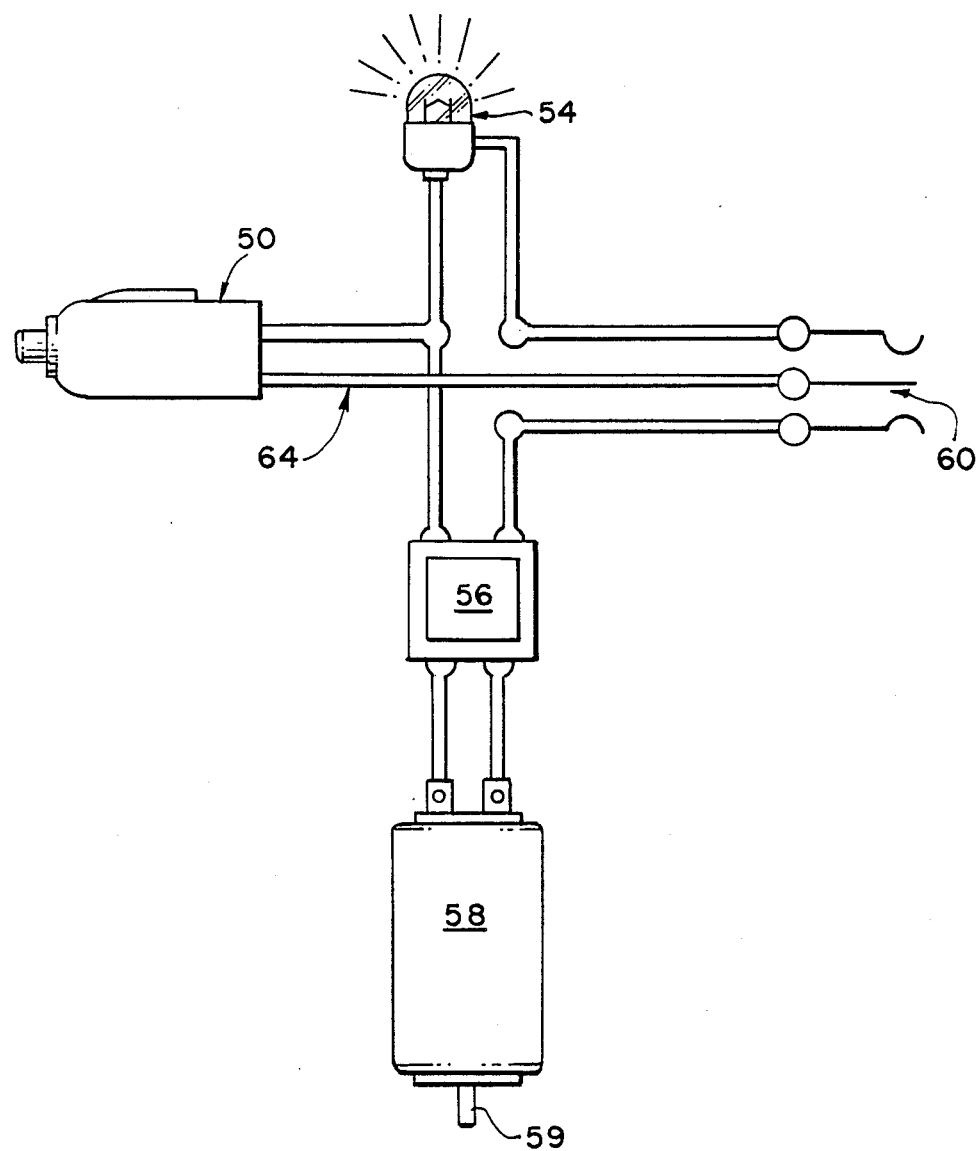
FIG. 3 is a schematic representation of the nut remover circuit used in the typical embodiment of the present invention.

An electrical circuit for the nut remover is shown in FIG. 3. The nut remover can be plugged into a twelve volt auto lighter socket using a plug 50. If the nut remover system is to be powered through the jack socket 34, then a smaller twelve volt accessory plug 52, as shown in FIG. 3A, and which fits into the smaller outlet 34, is used. The smaller plug 52 can be modified to fit into a standard twelve volt auto lighter socket using a sleeve adapter (not shown) which fits thereover. The nut remover can also include the lighting means 54 to help make it easier for the user to see what he or she is doing. A reversing switch 56 can be set to remove a tire nut or to put a tire nut back on. The nut remover is driven by the motor 58 acting on a driven axle 59 and controlled by a power switch 60 having three settings: power off/light off; power off/light on; and power on/light on.

In use, the active socket 80 of the nut remover is placed over the nut to be loosened, while the inactive or non-rotating socket 84 is placed over an opposite nut. The switch 60 is activated causing rotation of the socket 80. Torque normally generated opposite the direction of rotation of the socket 80 is transferred through the handle 62 and opposite leg to the non-rotating socket 84 anchored on an opposite nut. Nut removal and nut tightening is thus facilitated, the generated torque being absorbed by the auto rather than the operator.

Figure 5A:
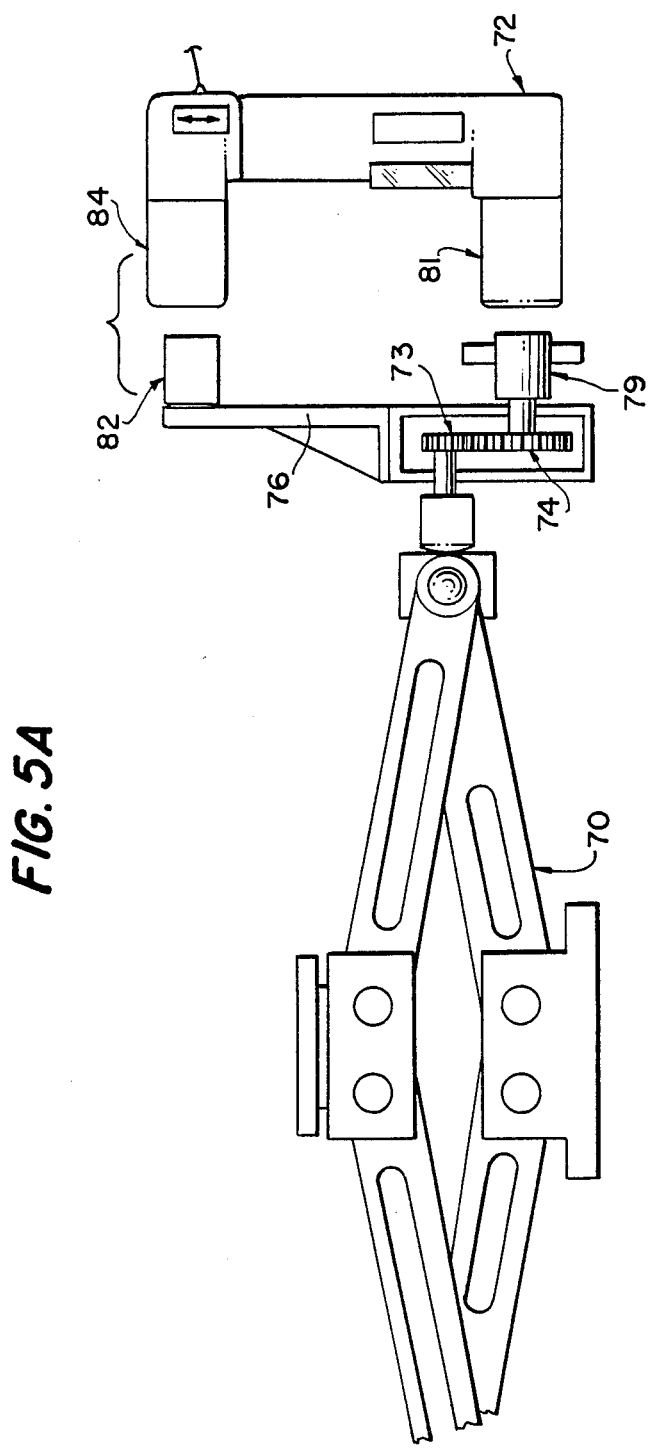
FIG. 5A is a schematic representation of a variation of a jack system similar to that of FIG. 4A with the nut remover not engaged.

In an alternative version of the jack of the present invention, the jack itself is not electrically powered, but is instead mechanically driven by the electrically powered nut remover. FIGS. 4A and 5A show two variations of this embodiment. In both of these variations shown, the mechanical jack 70 is driven by the tire nut remover 72 through the turning of gears 73 and 74 and a drive bolt 78, all of which form a part of the jack 70 and which are provided within a housing 75. Extending from the housing 75 is a torque arm 76 having a suitable support at its distal end for cooperation with a non-rotating socket 84 of the nut remover 72.

In the variation shown in FIG. 4A, the drive bolt 78 of the jack fit in the powered socket 80 of the nut remover 72. Also in the embodiment shown in FIG. 4A the non-rotating socket 84 of the nut remover 72 slips into an opening 88 in piece 86 as shown in FIG. 4B thereby countering the torque created by the driven side. This makes the tire nut remover 72 much easier to handle, because the tire nut remover 72 has a natural tendency to want to turn or twist thus making it hard to hold onto.

Figure 5C:
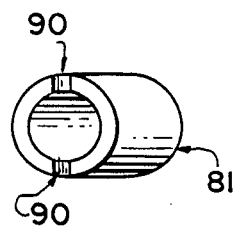
FIG. 5C is a schematic showing how a bolt in FIG. 5A
Figure 5B:
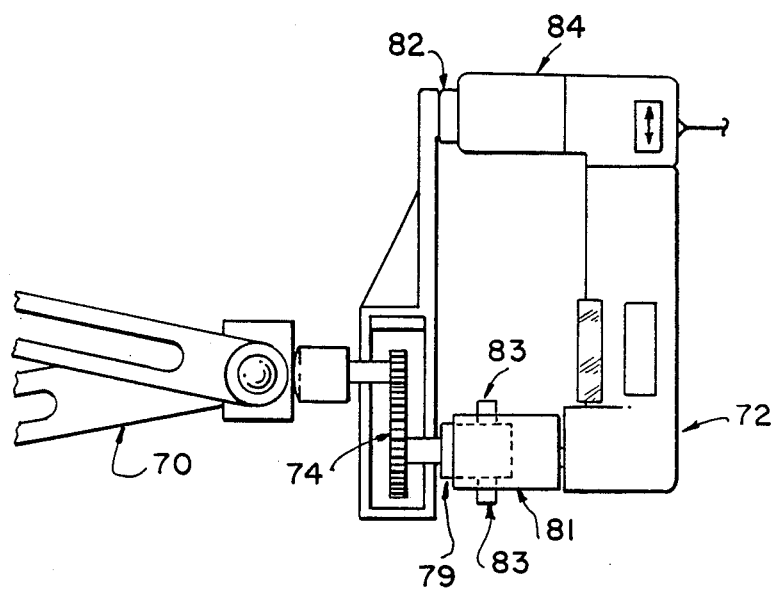
FIG. 5B is a schematic representation of the nut remover variation of FIG. 5A engaged with the jack.

In the jack variation shown in FIGS. 5A and 5B an opposite bolt or rod 82 at the distal end of the torque arm 76 fits into the non-motorized socket 84 of the nut remover 72 again countering the torque created by the driven side.

Another variation shown in FIGS. 5A, 5B and 5C is the use of a notched socket 81 having a pair of opposite grooves or notches 90 spaced 180° from one another. The jack drive bolt 79 which fits into socket 81 has two prongs 83 which slide into the notches 90 of the socket 81. The notched socket 81 allows a few degrees of free movement to help make alignment of the dual sockets easier.

The nut remover may also be provided with a second electrical socket like the socket 34 of the FIG. 1 embodiment for the plugging in of auxiliary devices such as a safety flasher light or an electrically powered air pump.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

The device may also have exterior common reflectors, and a momentary reverseable (deadman's) switch that requires that the button be held down by the operator to continuously operate the motor. Also the forementioned kill switch can be replaced by other gravity sensitive switches such as a free rolling ball and contact switch. When the jack is on a dangerous angle the conductive metal ball rolls out of position and breaks the circuit, preventing possibly hazardous operation.

What is claimed is:

1. An electrically powered automobile tire-changing apparatus, comprising:
   a first D.C. electric motor, and means for providing power to said motor including a cigarette-lighter type plug for plugging into an automobile cigarette lighter outlet;
   a jack for lifting the wheel of an automobile off the ground to enable the changing of a tire;
   a nut remover for removing nuts from a wheel to permit removal of a wheel from an automobile and for reapplying and tightening nuts for replacement of a wheel to the automobile;

2. Apparatus according to claim 1 wherein said first motor is housed in said jack, and further comprising a second D.C. motor for driving said nut remover, said second D.C. motor having a cigarette-lighter type plug for plugging into an automobile cigarette lighter outlet.

means for coupling said first D.C. electric motor to at least one of said jack and said nut remover so that said first motor will drive at least one of said jack and said nut remover; and a level switch for automatically cutting current to said first motor when said jack is inclined at an angle unsafe for lifting an automobile.

3. Apparatus according to claim 1 further comprising a lamp housed in said jack for illuminating an area about said jack.

4. An electrically powered automobile tire-changing apparatus, comprising:

a first D.C. electric motor, and means for providing power to said motor including a cigarette-lighter type plug for plugging into an automobile cigarette lighter outlet;

a jack for lifting the wheel of an automobile off the ground to enable the changing of a tire;

a nut remover for removing nuts from a wheel to permit removal of a wheel from an automobile and for reapplying and tightening nuts for replacement of a wheel to the automobile; and means for coupling said first D.C. electric motor to at least one of said jack and said nut remover so that said first motor will drive at least one of said jack and said nut remover;

wherein said first motor is housed in said jack, and further comprising a second D.C. motor for driving said nut remover, said jack further including a second outlet for a second plug, said second D.C. motor having a plug for plugging into said second outlet.

5. Apparatus according to claim 4 further comprising an adaptor for said second plug to convert said second plug into a cigarette-lighter type plug.

6. Apparatus according to claim 4 further comprising a level switch for automatically cutting current to said first motor when said jack is inclined at an angle unsafe for lifting an automobile.

7. Apparatus according to claim 4 further comprising a lamp housed in said jack for illuminating an area about said jack.

8. An electrically powered automobile tire-changing apparatus, comprising:

a first D.C. electric motor, and means for providing power to said motor including a cigarette-lighter type plug for plugging into an automobile cigarette lighter outlet;

a jack for lifting the wheel of an automobile off the ground to enable the changing of a tire;

a nut remover for removing nuts from a wheel to permit removal of a wheel from an automobile and for reapplying and tightening nuts for replacement of a wheel to the automobile; and means for coupling said first D.C. electric motor to at least one of said jack and said nut remover so that said first motor will drive at least one of said jack and said nut remover;

wherein said first motor is housed in said jack, and further comprising a second D.C. motor for driving said nut remover, said jack further including a second outlet for a second plug, said second D.C. motor having a plug for plugging into said second outlet;

wherein said nut remover has a U-shaped configuration including a handle portion at the base of said U, a powered nut socket extending from one leg of said U and a torque stabilizing socket extending from another leg of said U.

9. Apparatus according to claim 8 wherein said first motor is housed in said nut remover, and further comprising means for coupling said jack and said nut remover whereby said nut remover comprises means to power said jack.

10. Apparatus according to claim 9 further comprising a lamp housed in said nut remover for illuminating a work area adjacent thereto.

11. An electrically powered automobile tire-changing apparatus, comprising:

a first D.C. electric motor, and means for providing power to said motor including a cigarette-lighter type plug for plugging into an automobile cigarette lighter outlet;

a jack for lifting the wheel of an automobile off the ground to enable the changing of a tire;

a nut remover for removing nuts from a wheel to permit removal of a wheel from an automobile and for reapplying and tightening nuts for replacement of a wheel to the automobile; and means for coupling said first D.C. electric motor to at least one of said jack and said nut remover so that said first motor will drive at least one of said jack and said nut remover;

wherein said nut remover has a U-shaped configuration including a handle portion at the base of said U, a powered nut socket extending from a first leg of said U and a torque stabilizing means at a distal end of a second leg of said U.

12. Apparatus according to claim 11 wherein said torque stabilizing means comprises a nut socket extending from said second leg of said U.

13. Apparatus according to claim 11 wherein said means for coupling said jack and said nut remover comprises a pair of circumferentially opposed slots in said powered nut socket and a complementary pin in a drive bolt of said jack.

14. Apparatus according to claim 11 wherein said first motor is housed in said nut remover.

15. Apparatus according to claim 11 further comprising a lamp housed in said nut remover for illuminating a work area adjacent thereto.

* * * * *